(12) United States Patent
Tikoian et al.

(10) Patent No.: US 11,714,532 B2
(45) Date of Patent: Aug. 1, 2023

(54) GENERATING PRESENTATION INFORMATION ASSOCIATED WITH ONE OR MORE OBJECTS DEPICTED IN IMAGE DATA FOR DISPLAY VIA A GRAPHICAL USER INTERFACE

(71) Applicant: Capital One Services, LLC, McLean, VA (US)

(72) Inventors: Kathryn Tikoian, Arlington, VA (US); Tyler Maiman, Melville, NY (US); Phoebe Atkins, Rockville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/644,428

(22) Filed: Dec. 15, 2021

(65) Prior Publication Data

US 2023/0185436 A1 Jun. 15, 2023

(51) Int. Cl.
*G06F 3/04842* (2022.01)
*G06T 7/70* (2017.01)
*G06F 3/0487* (2013.01)
*G06F 3/04815* (2022.01)

(52) U.S. Cl.
CPC ........ *G06F 3/04842* (2013.01); *G06F 3/0487* (2013.01); *G06F 3/04815* (2013.01); *G06T 7/70* (2017.01)

(58) Field of Classification Search
CPC ............. G06F 3/04842; G06F 3/04815; G06F 3/0487; G06T 7/70
See application file for complete search history.

(56) References Cited

U.S. PATENT DOCUMENTS

| 8,219,558 B1 * | 7/2012 | Trandal | G06Q 50/16 |
| | | | 707/736 |
| 9,836,793 B2 * | 12/2017 | Busque | G06Q 50/22 |
| 10,210,577 B1 * | 2/2019 | Davis | G06Q 10/087 |

(Continued)

OTHER PUBLICATIONS

"Xactware Announces New Vai-Powered Technology for Image Detection to Assist the Contents Packout Industry"; Verisk Analytics, Inc.; 2 pages; https://www.verisk.com/press-releases/2020/april/xactware-announces-new-vai-powered-technology-for-image-detection-to-assist-the-contents-packout-industry/.

(Continued)

*Primary Examiner* — Ryan F Pitaro
(74) *Attorney, Agent, or Firm* — Harrity & Harrity, LLP (57) ABSTRACT

A server device may be configured to obtain image data that depicts a set of objects associated with a user. The server device may be configured to process, using at least one image analysis technique, the image data to determine identification information for each object of the set of objects. The server device may be configured to obtain exchange data related to at least one exchange log of the user and may be configured to determine, based on the exchange data and the identification information, estimated exchange information for each object of a subset of objects of the set of objects. The server device may be configured to determine, based on the estimated exchange information, estimated assessment information for each object of the subset of objects and may be configured to generate, based on the estimated assessment information, presentation information for display via a graphical user interface (GUI).

20 Claims, 8 Drawing Sheets

(56) References Cited

U.S. PATENT DOCUMENTS

| | | | | |
|---|---|---|---|---|
| 10,521,865 | B1* | 12/2019 | Spader | G06K 9/627 |
| 10,672,080 | B1* | 6/2020 | Maurer | G06Q 20/34 |
| 10,970,549 | B1* | 4/2021 | Krishnan | G06V 20/20 |
| 11,055,531 | B1* | 7/2021 | Maestas | G06Q 30/0283 |
| 11,182,860 | B2* | 11/2021 | Kuruvilla | G06Q 40/08 |
| 11,468,515 | B1* | 10/2022 | Sanchez | G06Q 10/10 |
| 2015/0032480 | A1* | 1/2015 | Blackhurst | G06Q 40/08 |
| | | | | 705/4 |
| 2019/0188796 | A1* | 6/2019 | Sauer | G06Q 20/102 |
| 2021/0192620 | A1* | 6/2021 | Golomb | G06N 20/20 |
| 2021/0279852 | A1* | 9/2021 | Jakka | H04N 5/247 |
| 2021/0279957 | A1* | 9/2021 | Eder | G06Q 30/0205 |
| 2022/0101245 | A1* | 3/2022 | Daley | G06F 16/953 |
| 2022/0148051 | A1* | 5/2022 | Bagnall | G06Q 10/20 |
| 2022/0222752 | A1* | 7/2022 | Gulati | G06F 16/9038 |

OTHER PUBLICATIONS

Kailan Shang, "Applying Image Recognition to Insurance", Society of Actuaries, Jun. 2018, pp. 1-36, https://www.soa.org/globalassets/assets/Files/resources/research-report/2018/applying-image-recognition.pdf.

* cited by examiner

GENERATING PRESENTATION INFORMATION ASSOCIATED WITH ONE OR MORE OBJECTS DEPICTED IN IMAGE DATA FOR DISPLAY VIA A GRAPHICAL USER INTERFACE

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user interface of the user device to cause the user device to perform an action. Additionally, the user interface may provide information to the user.

SUMMARY

Some implementations described herein relate to a server device for generating presentation information for display via a graphical user interface (GUI). The server device may include one or more memories and one or more processors communicatively coupled to the one or more memories. The server device may be configured to obtain image data that depicts a set of objects associated with a user. The server device may be configured to process, using at least one image analysis technique, the image data to determine identification information for each object of the set of objects. The server device may be configured to obtain exchange data related to at least one exchange log of the user. The server device may be configured to determine, based on the exchange data and the identification information, estimated exchange information for each object of a subset of objects of the set of objects. The server device may be configured to determine, based on the estimated exchange information, estimated assessment information for each object of the subset of objects. The server device may be configured to generate, based on the estimated assessment information, the presentation information for display via the GUI.

Some implementations described herein relate to a non-transitory computer-readable medium that stores a set of instructions for a device. The set of instructions, when executed by one or more processors of the device, may cause the device to obtain image data that depicts a set of objects associated with a user. The set of instructions, when executed by one or more processors of the device, may cause the device to process the image data to determine identification information for each object of the set of objects. The set of instructions, when executed by one or more processors of the device, may cause the device to obtain exchange data related to at least one exchange log of the user. The set of instructions, when executed by one or more processors of the device, may cause the device to determine, based on the exchange data and the identification information, estimated assessment information for each object of a subset of objects of the set of objects. The set of instructions, when executed by one or more processors of the device, may cause the device to provide at least some of the estimated assessment information for display via a graphical user interface GUI.

Some implementations described herein relate to a method of generating presentation information for display via a GUI. The method may include obtaining, by a device, image data that depicts an object associated with a user. The method may include processing, by the device, the image data to determine identification information associated with the object. The method may include obtaining, by the device, exchange data related to at least one exchange log of the user. The method may include determining, by the device and based on the exchange data and the identification information associated with the object, estimated assessment information associated with the object. The method may include generating, by the device and based on the estimated assessment information, the presentation information for display via the GUI.

DETAILED DESCRIPTION

The following detailed description of example implementations refers to the accompanying drawings. The same reference numbers in different drawings may identify the same or similar elements.

A person may need to determine an estimated assessment amount (e.g., an estimated value) of one or more objects that the person owns. For example, when shopping for an insurance policy (e.g., a homeowner's insurance policy or a renter's insurance policy), the person may need to determine the estimated assessment information to determine an amount of insurance coverage that is needed to cover the one or more objects (e.g., as "personal property" or "valuable articles"). In an additional example, when submitting an insurance claim for damage to or destruction of the one or more objects, the person may need to determine the estimated assessment information to determine an amount of the insurance claim.

In some cases, the person may use a software program or a website application to itemize and estimate assessment amounts of the one or more objects. However, this requires an excessive use of computing resources (e.g., processing resources, memory resources, communication resources, and/or power resources, among other examples) of a user device, one or more server devices, or other devices, for the user to interact with a GUI (e.g., that is presented on the user device via the software program or the website application) for a user to input this information. For example, computing resources are used for the person to navigate and interact with a large number of pages, fields, menus, and/or other elements to input information that identifies the one or more objects, that links the one or more objects to exchange information (e.g., receipts of purchase exchanges for the one or more objects), that estimates assessment values, and/or that provides other information associated with the one or more objects. This superfluous navigation and interaction with a GUI typically creates a poor user experience for the person as well.

Some implementations described herein provide a device (e.g., a user device and/or server device) that obtains image data associated with one or more images. The one or more images may have been captured by at least one camera of the user device and may depict scenes associated with a user of the user device. For example, the one or more images may depict "selfie" images of the user, images of friends of the user, and/or images of events or parties attend by the user, among other examples. Importantly, the one or more images may depict objects, such as personal objects of the user that the user purchased. For example, a selfie image of the user may include a depiction of furniture or a kitchen appliance that is owned by the user. In some implementations, the device may process the image data to determine identification information associated with a set of objects that are depicted in the image data. For example, the device may process the selfie image described above to identify the furniture and/or the kitchen appliance (but not the user).

In some implementations, the device may obtain exchange data related to at least one exchange log of the user (e.g., data that indicates one or more exchanges, such as purchase exchanges, of the user). Accordingly, the device, based on the identification information associated with the set of objects and the exchange data, may determine estimated assessment information for each object of the set of objects. The estimated assessment information for each object, of the set of objects, may indicate an estimated assessment amount (e.g., an estimated present value) of the object. The device then may generate presentation information (e.g., based on the estimated assessment information) for display via a GUI (e.g., on a display of the user device). The presentation information may include, for each object of the set of objects that are associated with the user and that are depicted in the image data, some or all of the identification information for the object and/or some or all of the estimated assessment information for the object. In relation to the example described above, the presentation information may identify estimated assessment amounts for the furniture and the kitchen appliance, respectively.

In this way, some implementations described herein automatically compile an inventory of objects and estimated assessment amounts as presentation information and provide the presentation information for display via a GUI. This reduces utilization of computing resources by devices that would otherwise be needed to compile the presentation information and/or to present an interface for entering the presentation information (e.g., as described above in relation to a software program or a website application). Further, a user experience is improved by automatically compiling and providing the presentation information for display via the GUI and thereby minimizing an amount of navigation and/or interaction by the user to input and/or generate the presentation information. Additionally, the presentation information can be used, for example, to identify an insurance policy (e.g., a home insurance policy) that adequately covers objects and/or to automatically prepare an insurance claim when the objects have been damaged or destroyed by an insured event.

FIGS. 1A-1D are diagrams of an example 100 associated with generating presentation information associated with one or more objects depicted in image data for display via a graphical user interface. As shown in FIGS. 1A-1D, example 100 includes a user device, a server device, and a host server. These devices are described in more detail in connection with FIGS. 3 and 4.

Figure 1A:
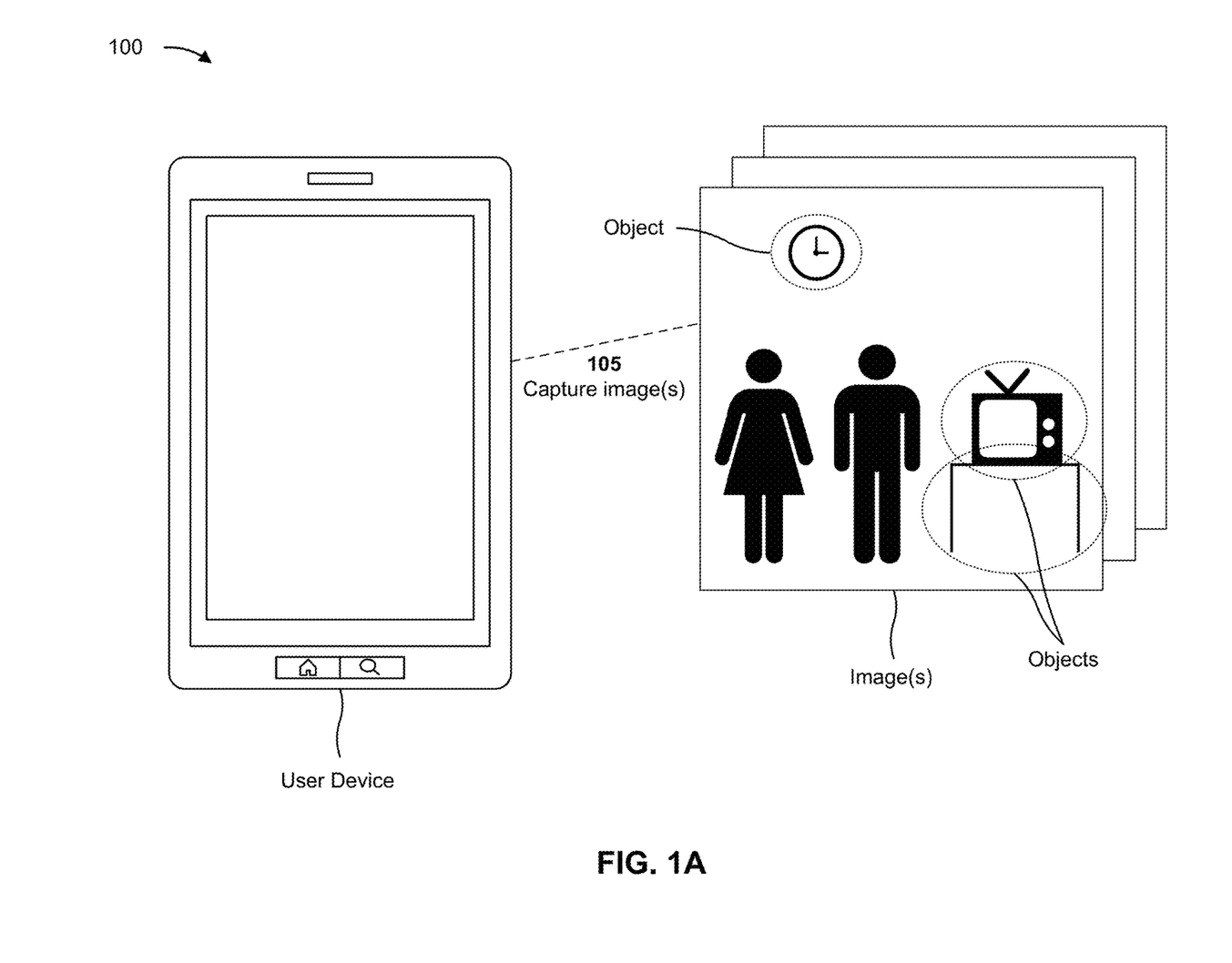
FIGS. 1A-1D are diagrams of an example implementation relating to generating presentation information associated with one or more objects depicted in image data for display via a graphical user interface.

As shown in FIG. 1A, and by reference number 105, the user device may capture one or more images. For example, the user device may include at least one camera and a user of the user device may interact with the user device (e.g., via an image capture application of the user device) to cause the at least one camera to capture the one or more images. Accordingly, the user device may store the one or more images in a data structure that is configured to store images captured by the at least one camera of the user device, such as an electronic photo album or another type of image repository. The data structure may be included in the user device, or may be included in another device that is accessible to the user device (e.g., via a network), such as the server device. Additionally, or alternatively, the user device may upload the one or more images to a device (e.g., another server device) associated with an online service, such as a social media service. For example, the user of the user device may interact with the user device (e.g., via an online service application) to log in to an online service account and may cause the user device to upload the one or more images to the device associated with the online service account.

In some implementations, each image, of the one or more images, may be associated with a scene (e.g., that is within a field of view (FOV) of the at least one camera of the user device) at a physical location. Accordingly, the image may depict, for example, one or more people, one or more objects, one or more animals, and/or one or more structures (e.g., buildings) in the scene at the physical location. In a specific example, as shown in FIG. 1A, an image may depict two people and multiple objects, such as a table, a television, and a clock. Over a period of time (e.g., a period of hours, days, weeks, months, or years), the user device may capture multiple images of different scenes. Accordingly, image data associated with the multiple images may depict multiple scenes, multiple people, multiple objects, multiple animals, and/or multiple structures at multiple different instants of time during the period of time. In some implementations, the image data may depict a set of objects (e.g., one or more objects of the multiple objects) that are associated with a particular person, such as the user of the user device. For example, the image data may depict a set of objects that are owned by the user.

Figure 1B:
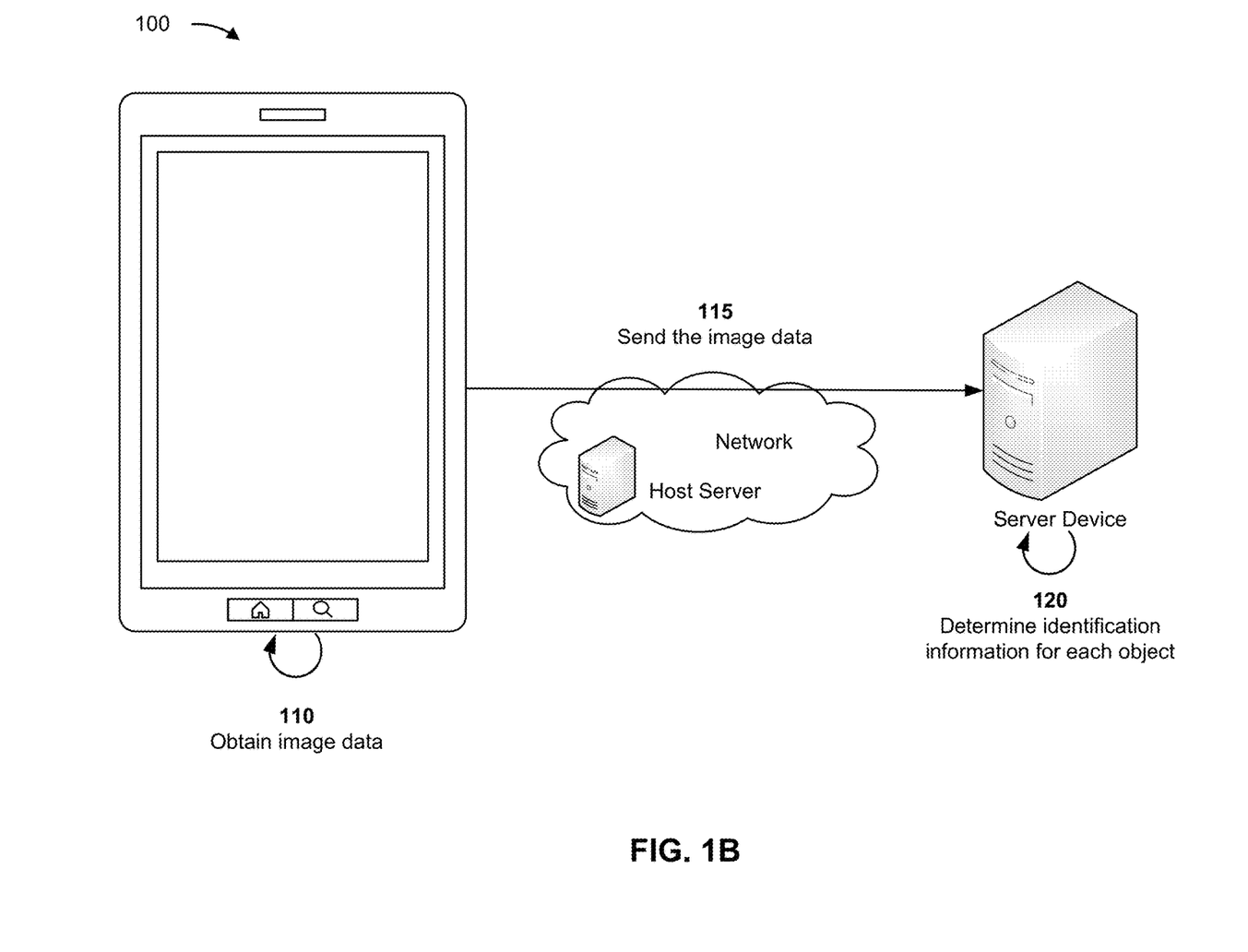

In some implementations, the user device may include an object assessment application that is configured to facilitate identifying and assessing objects (e.g., identifying and determining a monetary value of objects) depicted in image data. Accordingly, as shown in FIG. 1B, and by reference number 110, the user of the user device may interact with the user device (e.g., via the object assessment application) to cause the user device to obtain image data. For example, the user device may identify the data structure that is configured to store images captured by the at least one camera of the user device (e.g., the electronic photo album) and may obtain, from the data structure, image data that is associated with all of the images stored in the data structure. Alternatively, the user may interact with the user device (via the object assessment application) to select a set of images (e.g., one or more images) of all of the images stored in the data structure, which may cause the user device to obtain, from the data structure, image data that is associated with the set of images.

As shown by reference number 115, the user device may send the image data (e.g., that was obtained by the user device) to the server device (e.g., to facilitate identifying and assessing objects depicted in the image data). For example, the user device may send the image data to the server device by sending the image data to a host server of a network, which may send the image data to the server device. Alternatively, the server device may obtain the image data from an online service (e.g., a social media service). For example, the user of the user device may interact with the user device (e.g., via the object assessment application) to provide, to the server device, information indicating an online service account of the user (e.g., information indicating a social media profile of the user). Accordingly, the server device may communicate with a device associated with the online service account (e.g., another server device) to obtain the image data (e.g., to download image data associated with images posted to the social media profile of the user). In this way, the server device may obtain image data that depicts a set of objects (e.g., one or more objects) that are associated with the user of the user device (e.g., that depicts a set of objects that are owned by the user of the user device).

As shown by reference number 120, the server device may determine identification information for each object of the set of objects that are associated with the user and that are depicted in the image data. The identification information may indicate for each object, of the set of objects, an identifier of the object (e.g., what the object "is," such as a table, a television, or a clock), a classification of the object (e.g., whether the object is "personal property," a "valuable article," or another type of property under an insurance policy), a product name associated with the object (e.g., a manufacturer and/or originator of the object), a product model associated with the object (e.g., a particular type of the object), at least one imaging location associated with the object (e.g., at least one physical location at which at least one image of the object was captured), or at least one time of imaging of the object (e.g., at least one time at which at least one image of the object was captured).

In some implementations, the server device may process, using at least one image analysis technique (e.g., at least one object detection technique, such as a single shot detector (SSD) technique, a you-only-look-once (YOLO) technique, and/or a recurrent convolutional neural network (RCNN) technique, among other examples) to determine the identification information for each object of the set of objects. Additionally, or alternatively, the server device may use a machine learning model to determine the identification information for each object of the set of objects. For example, the user device may process, using the machine learning model, the image data to determine the identification information for each object of the set of objects. In some implementations, the user device may train the machine learning model based on historical data (e.g., historical image data that depicts objects) and/or additional information, such as identification information for each of the objects depicted by the historical image data. Using the historical data and/or the additional information as inputs to the machine learning model, the server device may train the machine learning model to determine identification information for an object. In some implementations, the machine learning model may be trained and/or used in a manner similar to that described below with respect to FIG. 2.

In some implementations, the server device may process the image data to identify a subset of the image data. For example, the server device may process the image data to identify a subset of the image data that is associated with a particular location associated with the user, such as location of a home of the user. Accordingly, the server device may process the subset of the image data to determine the identification information for each object of the set of objects. In this way, the server device may determine identification information for objects associated with the particular location, such as objects associated with the home of the user.

Figure 1C:
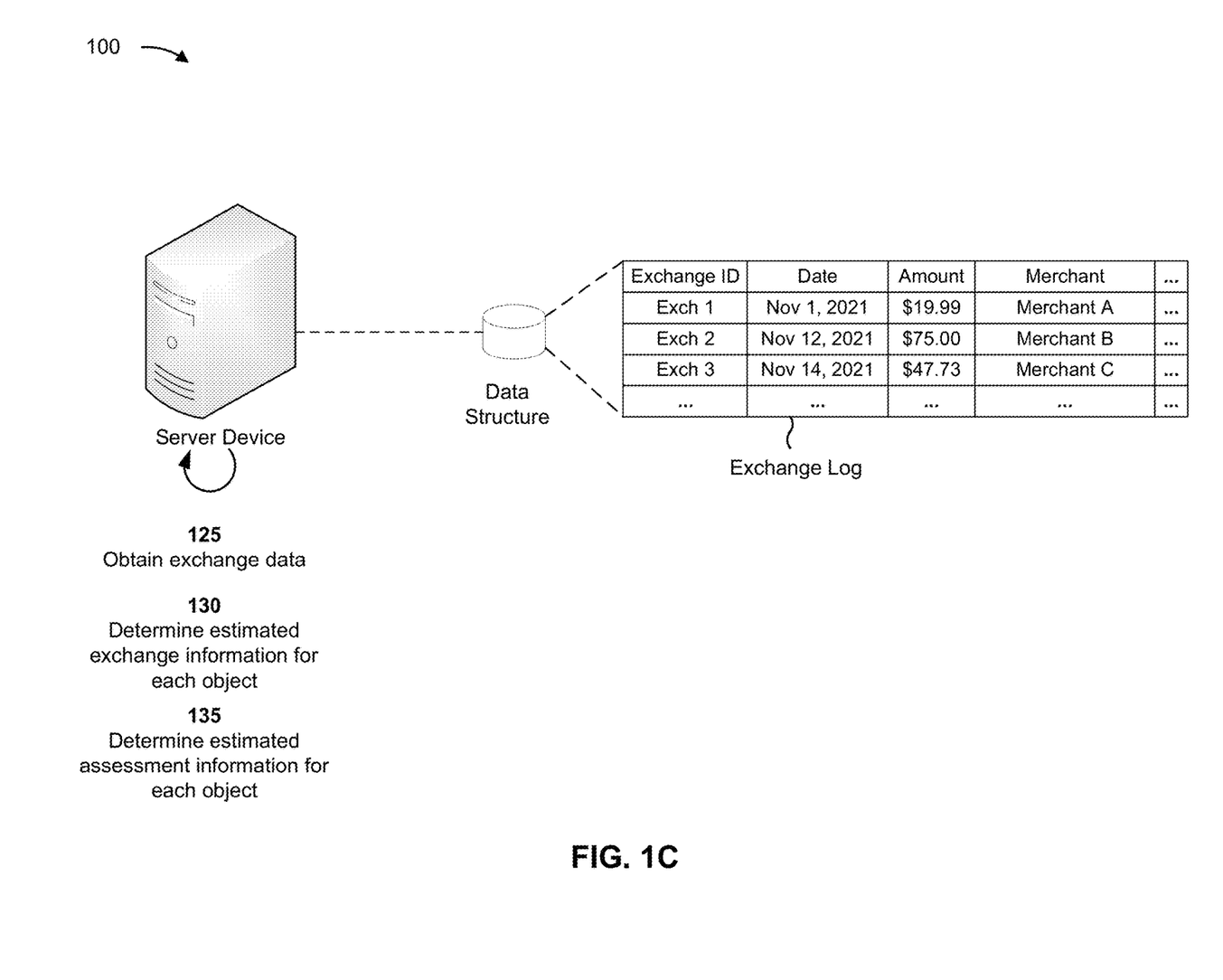

As shown in FIG. 1C, the user may be associated with at least one exchange log that is stored in data structure that is included in or accessible to the server device. An exchange log may include one or more entries that indicate exchanges between the user and another party, such as a merchant, at one or more particular instants of time. For example, as shown in FIG. 1C, an entry of an exchange log may indicate an exchange identifier (shown as exchange ID) of an exchange, a time of the exchange (shown as Date), an amount associated with the exchange (shown as Amount), and/or a party associated with the exchange (shown as Merchant). In a specific example, as further shown in FIG. 1C, a first entry of the exchange log indicates that an exchange with an exchange identifier of "Exch 1" occurred on "Nov. 1, 2021" for "$19.99" between the user and "Merchant A." An exchange may be associated with one or more objects. For example, an exchange may be a purchase, by the user, of the one or more objects at the time of the exchange for the amount associated with the exchange from the party associated with the exchange. In a specific example, as further shown in FIG. 1C, a second entry of the exchange log may indicate that the user purchased, in an exchange with an exchange identifier of "Exch 2," one or more objects for $75.00 on "Nov. 12, 2021" from the "Merchant B." In some implementations, an exchange log may include exchange information, respectively, for one or more objects. That is, the exchange log may include an entry that indicates an object associated with an exchange, an exchange amount associated with the object, and/or a time of the exchange. For example, the entry may indicate that the user purchased a particular object (e.g., a television) for a particular amount on a particular date from a particular party.

As further shown in FIG. 1C, and by reference number 125, the server device may obtain exchange data related to the at least one exchange log of the user. For example, the server device may communicate with the user device to obtain at least one authentication credential (e.g., a username and/or password, a security token, and/or at least one other type of credential) to access the at least one exchange log of the user. Accordingly, the server device may communicate (e.g., using the at least one authentication credential) with at least one data structure (e.g., a database, an electronic folder, and/or an electronic file that stores the at least one exchange log) to access the at least one exchange log and may thereby obtain the exchange data (e.g., by reading the at least one exchange log). The exchange data may include and/or indicate the information included in the at least one exchange log (e.g., the information indicated by the entries of the at least one exchange log).

As shown by reference number 130, the server device may determine estimated exchange information for each object of a subset of objects of the set of objects that are associated with the user and that are depicted in the image data (e.g., based on the exchange data and/or the identification information). The subset of objects may be objects that are associated with the exchange data. For example, the subset of objects may be objects that were purchased in one or more exchanges included in the exchange data. Accordingly, the server device may not (or may be unable to) determine estimated exchange information for other objects of the set of objects that are not in the subset of objects (e.g., because the server device has not obtained exchange data associated with the other objects).

The estimated exchange information may indicate for each object, of the subset of objects, an estimated exchange amount associated with the object and/or an estimated time of exchange associated with the object. For example, the server device may determine, based on the identification information for the object, at least one parameter associated with the object, such as an identifier of the object, a classification of the object, a product name of the object, and/or a product model of the object, among other examples. The server device may identify, based on the at least one parameter and the exchange data, an exchange event that is associated with the object. For example, the server device may determine, based on a product name and/or a product model of the object (e.g., a pair of shoes associated with a particular company brand), an exchange event associated with the object (e.g., a purchase exchange at a store associated with the particular company brand). The server device may determine, based on the exchange data, exchange event information associated with the exchange event. For example, the server device may determine an exchange amount (e.g., a purchase amount) associated with the exchange and a time of the exchange. Accordingly, the server device may determine, based on the exchange event information, the estimated exchange information for the object. For example, the server device may determine the estimated exchange amount (e.g., an estimated purchase amount) associated with the object based on the exchange amount (e.g., the purchase amount) associated with the exchange (e.g., by using one or more exchange amount estimation techniques). As another example, the server device may determine the estimated time of exchange associated with the object to be the time of the exchange indicated by the exchange event information.

As shown by reference number 135, the server device may determine estimated assessment information for each object of the subset of objects that are associated with the user and that are depicted in the image data (e.g., based on the exchange data, the identification information, and/or the estimated exchange information). The estimated assessment information for each object, of the subset of objects, may indicate an estimated assessment amount (e.g., an estimated present value) of the object.

In some implementations, the server device may use a machine learning model to determine the estimated assessment information for each object of the subset of objects. For example, the user device may process, using the machine learning model, the estimated exchange information for the object to determine the estimated assessment information for the object. As another example, the user device may process, using the machine learning model, the exchange data and/or the identification information to determine the estimated assessment information for the object. In some implementations, the user device may train the machine learning model based on historical data (e.g., historical estimated exchange information, historical exchange data, and/or historical identification information for a plurality of objects) and/or additional information, such as estimated assessment information for each of the plurality of objects. Using the historical data and/or the additional information as inputs to the machine learning model, the server device may train the machine learning model to determine estimated assessment information for an object. In some implementations, the machine learning model may be trained and/or used in a manner similar to that described below with respect to FIG. 2.

Figure 1D:
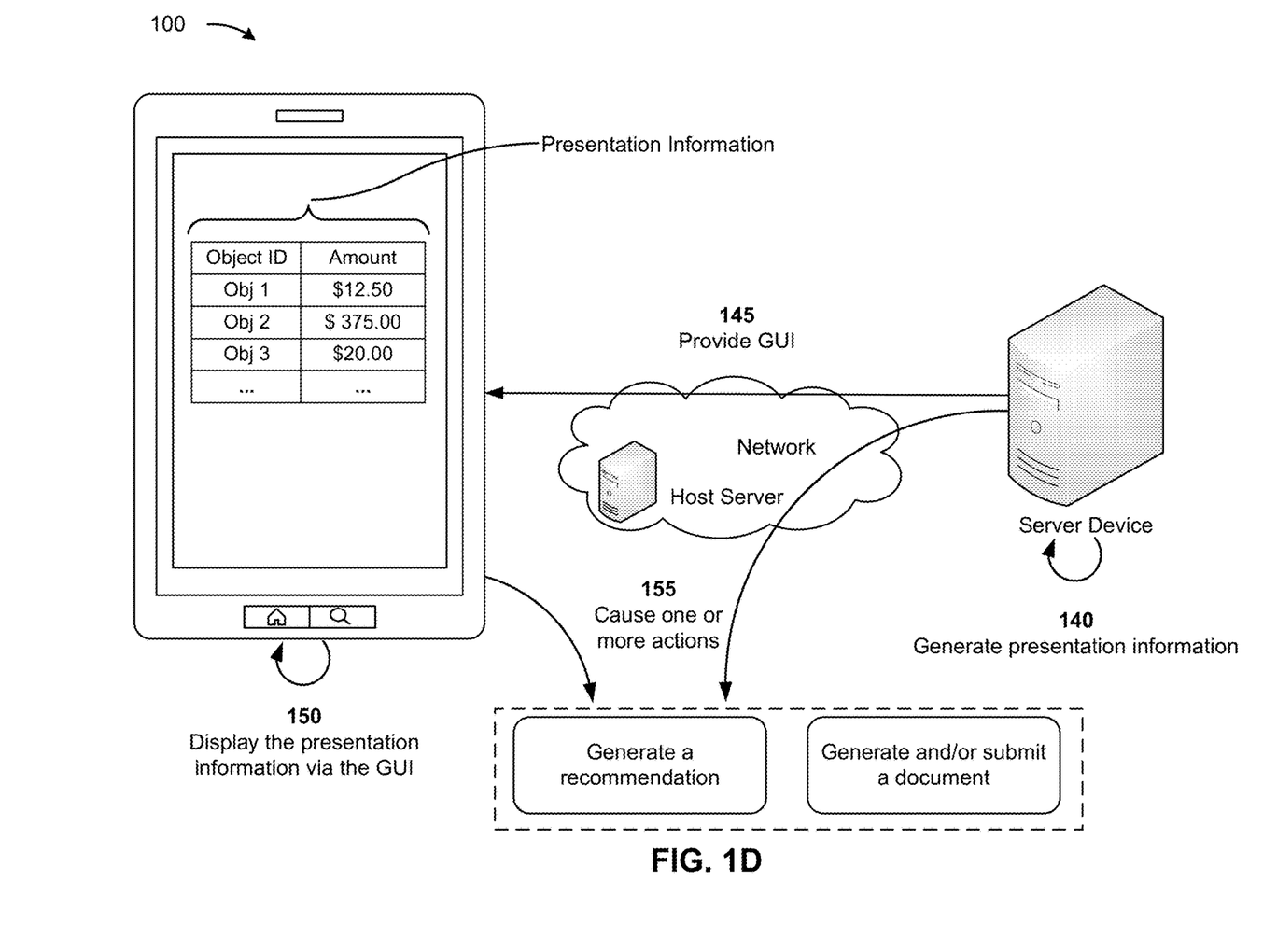

As shown in FIG. 1D, and by reference number 140, the server device may generate presentation information (e.g., based on the estimated assessment information) for display via a GUI. The presentation information may include, for each object of the subset of objects that are associated with the user and that are depicted in the image data, some or all of the identification information for the object and/or some or all of the estimated assessment information for the object. For example, as shown in FIG. 1D, the presentation information may include an identifier of the object (shown as Object ID) and the estimated assessment amount of the object (shown as Amount).

As shown by reference number 145, the server device may provide the GUI to the user device. For example, the server device may send the GUI to the host server of the network, which may send the GUI to the user device. As shown by reference number 150, the user device may display (e.g., when running the object assessment application) the presentation information on a display screen of the user device via the GUI.

As further shown in FIG. 1D, and by reference number 155, the user device and/or the server device may cause one or more actions to be performed. For example, one of the user device or the server device may determine, based on the estimated assessment information for each object of the subset of objects, total estimated assessment information for the subset of objects. The total estimated assessment information may indicate a sum of respective estimated assessment amounts of the subset of objects. Accordingly, one of the user device or the server device may generate, based on the total estimated assessment information for the subset of objects, a recommendation, such as an insurance product recommendation (e.g., to cover the sum of the respective estimated assessment amounts of the subset of objects), for display via the GUI. Alternatively, one of the user device or the server device may generate and submit, based on the total estimated assessment information for the subset of objects, a document, such as an insurance claim document associated with the subset of objects (e.g., to file an insurance claim for the sum of the respective estimated assessment amounts of the subset of objects). For example, one of the user device or the server device may generate the insurance claim document and communicate with another device (e.g., another server device) associated with an insurance company to submit the insurance claim document.

As indicated above, FIGS. 1A-1D are provided as an example. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of one or more examples 100 may perform one or more functions described as being performed by another set of devices of one or more examples 100. For example, the user device may perform one or more functions described as being performed by the server device, or vice versa.

Figure 2:
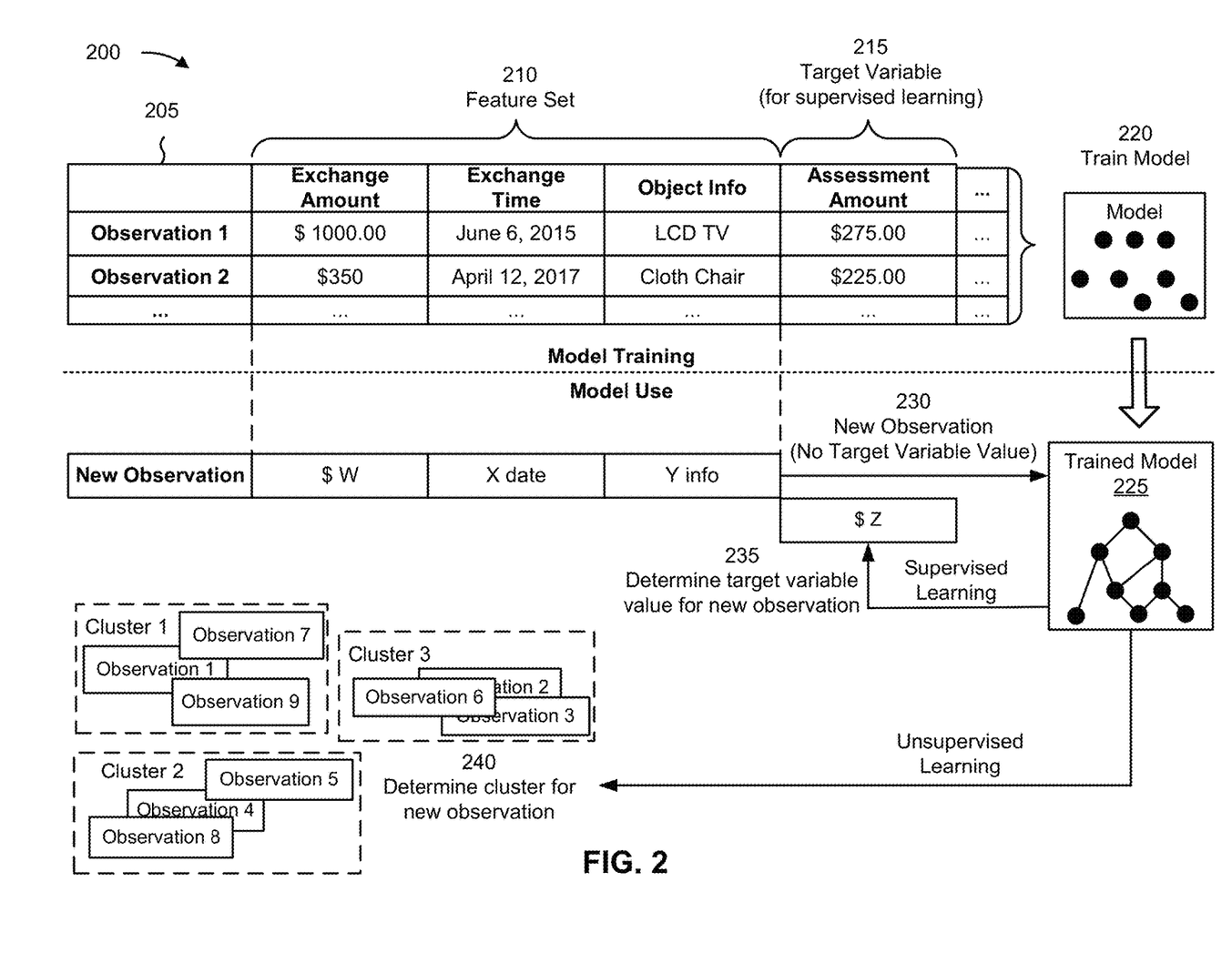
FIG. 2 is a diagram illustrating an example of training and using a machine learning model in connection with generating presentation information associated with one or more objects depicted in image data for display via a graphical user interface.

FIG. 2 is a diagram illustrating an example 200 of training and using a machine learning model in connection with generating presentation information associated with one or more objects depicted in image data for display via a graphical user interface. The machine learning model training and usage described herein may be performed using a machine learning system. The machine learning system may include or may be included in a computing device, a server, a cloud computing environment, or the like, such as the server device and/or the user device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the server device and/or the user device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the server device and/or the user device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of Exchange Amount, a second feature of Exchange Time, a third feature of Object Info, and so on. As shown, for a first observation, the first feature may have a value of $1000, the second feature may have a value of Jun. 6, 2015, the third feature may have a value of LCD TV, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is Assessment Amount, which has a value of $275.00 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of $ W, a second feature of X date, a third feature of Y info, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of $ Z for the target variable of Assessment Amount for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to provide the Assessment Amount to the user device via GUI. The first automated action may include, for example, generating presentation information that includes the Assessment Amount for display via a GUI.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a particular Assessment Amount categorization group), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determining estimated assessment information for an object. The machine learning system enables recognition and/or identification of tens, hundreds, thousands, or millions of features and/or feature values for tens, hundreds, thousands, or millions of observations, thereby increasing accuracy and consistency and reducing delay associated with determining estimated assessment information for an object relative to requiring computing resources to be allocated for tens, hundreds, or thousands of operators to manually determine estimated assessment information for an object using the features or feature values.

As indicated above, FIG. 2 is provided as an example. Other examples may differ from what is described in connection with FIG. 2.

Figure 3:
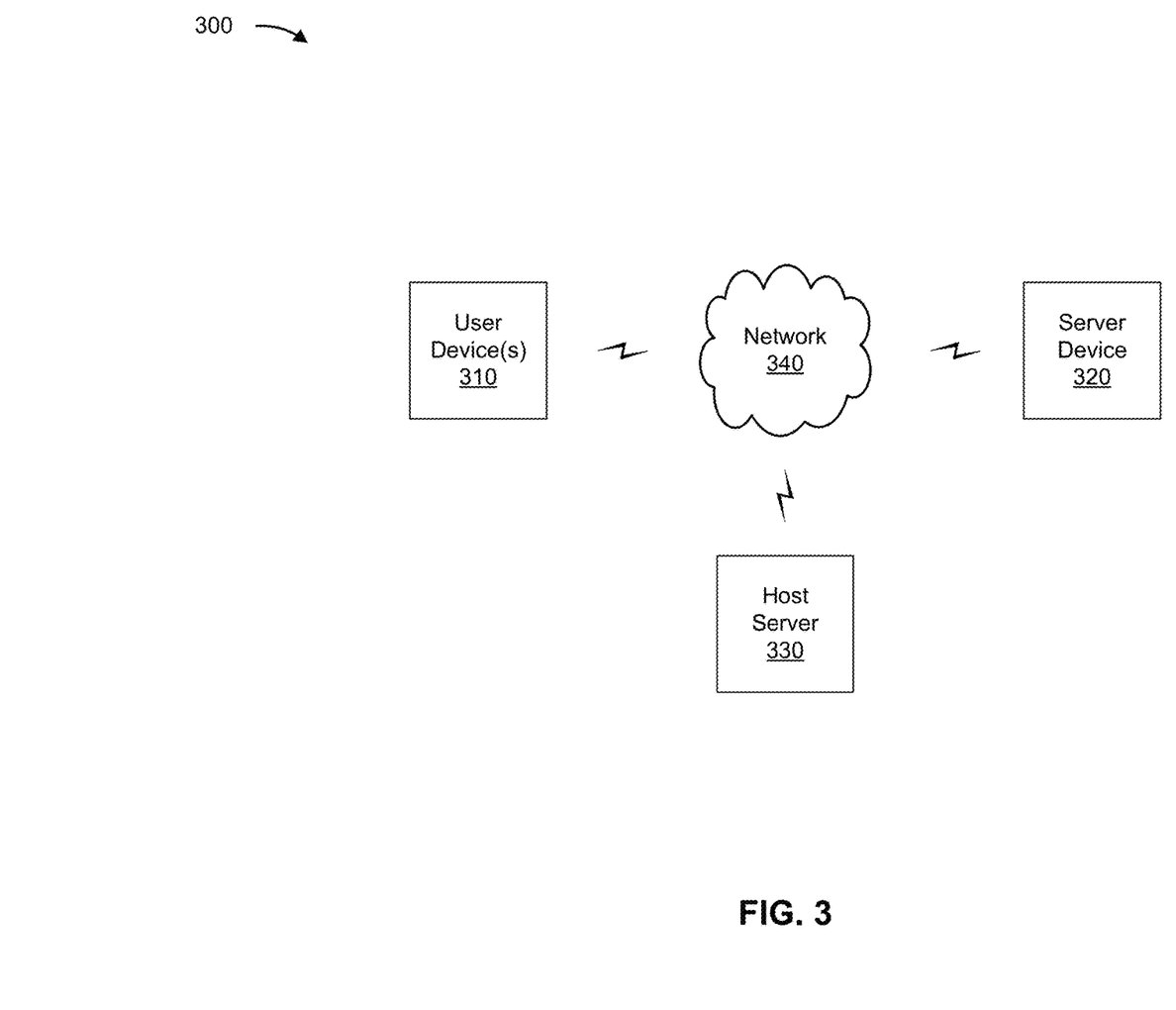
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, a server device 320, a host server 330, and a network 340. Devices of environment 300 may interconnect via wired connections, wireless connections, or a combination of wired and wireless connections.

The user device 310 includes one or more devices capable of receiving, generating, storing, processing, and/or providing information associated with generating presentation information for display via a GUI, as described elsewhere herein. The user device 310 may include a communication device and/or a computing device. For example, the user device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 320 includes one or more devices capable of receiving, generating, storing, processing, providing, and/or routing information associated with generating presentation information for display via a GUI, as described elsewhere herein. The server device 320 may include a communication device and/or a computing device. For example, the server device 320 may include a server, such as an application server, a client server, a web server, a database server, a host server, a proxy server, a virtual server (e.g., executing on computing hardware), or a server in a cloud computing system. In some implementations, the server device 320 includes computing hardware used in a cloud computing environment.

The host server 330 includes one or more devices capable of receiving, generating, storing, processing, providing, and/or routing information associated with generating presentation information for display via a GUI, as described elsewhere herein. The host server 330 may include a communication device and/or a computing device, such as a server device. For example, the host server 330 may include a server, such as an application server, a web server, a proxy server, a virtual server (e.g., executing on computing hardware), or a server in a cloud computing system. In some implementations, the host server 330 includes computing hardware used in a cloud computing environment. In some implementations, the server device 320 is implemented on and integrated with the host server 330 (e.g., to grant or deny access to resources hosted or served by the host server 330).

The network 340 includes one or more wired and/or wireless networks. For example, the network 340 may include a cellular network, a public land mobile network, a local area network, a wide area network, a metropolitan area network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
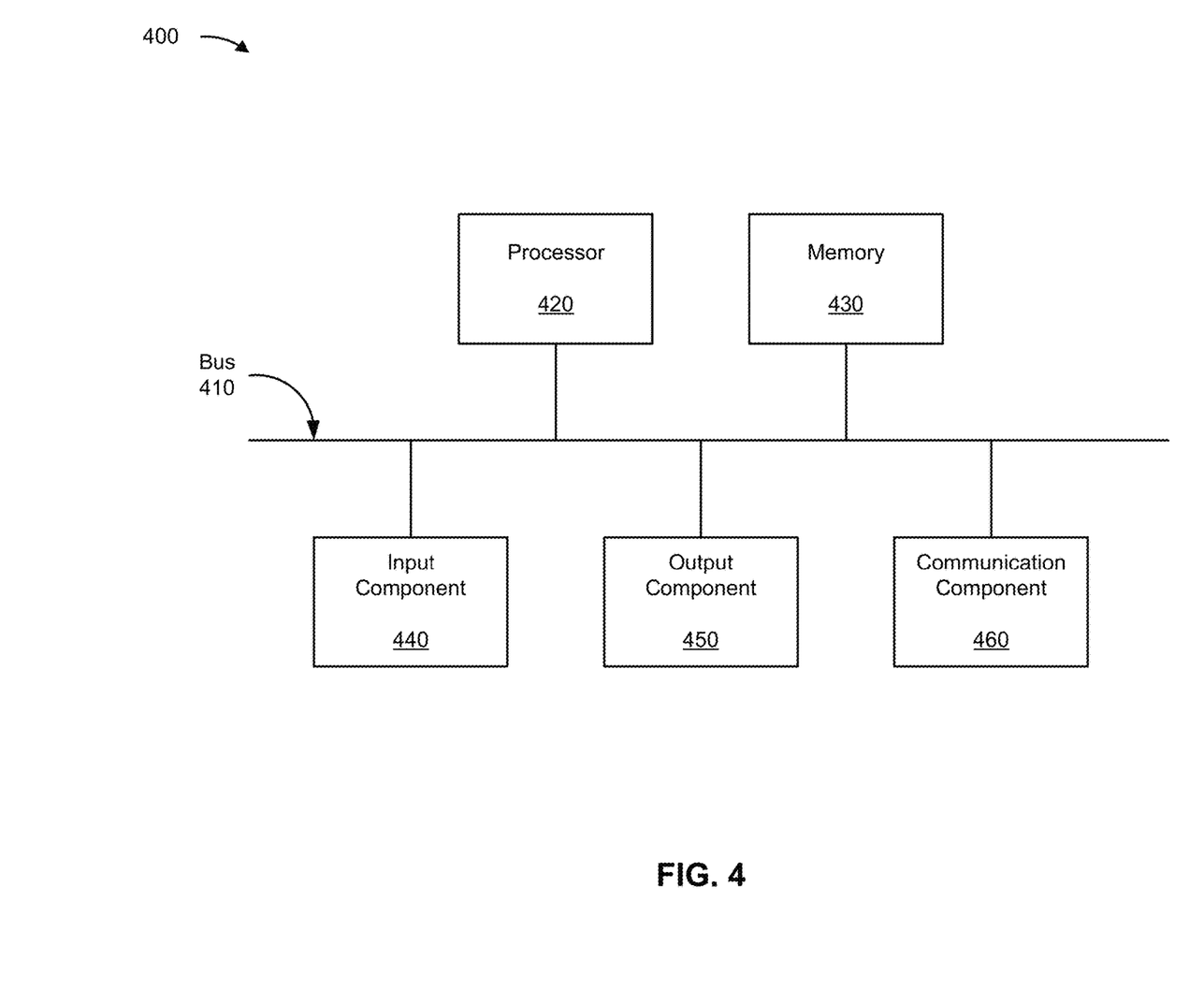
FIG. 4 is a diagram of example components of one or more devices of FIG. 3.

FIG. 4 is a diagram of example components of a device 400, which may correspond to the user device 310, the server device 320, and/or the host server 330. In some implementations, the user device 310, the server device 320, and/or the host server 330 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
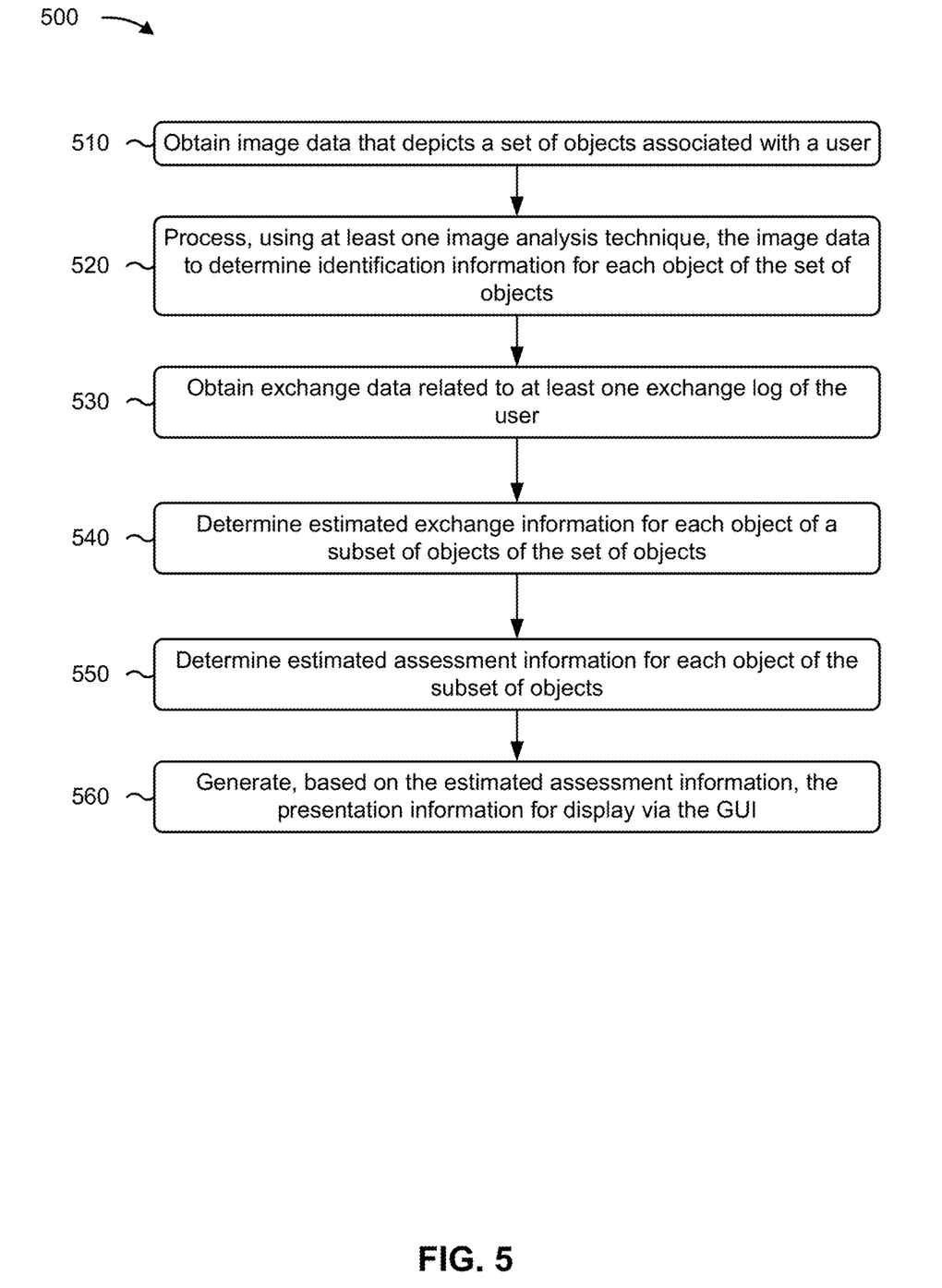
FIG. 5 is a flowchart of an example process relating to generating presentation information associated with one or more objects depicted in image data for display via a graphical user interface.

FIG. 5 is a flowchart of an example process 500 associated with generating presentation information associated with one or more objects depicted in image data for display via a graphical user interface. In some implementations, one or more process blocks of FIG. 5 may be performed by a device (e.g., the user device 310 or the server device 320). In some implementations, one or more process blocks of FIG. 5 may be performed by another device or a group of devices separate from or including the device. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include obtaining image data that depicts a set of objects associated with a user (block 510). As further shown in FIG. 5, process 500 may include processing, using at least one image analysis technique, the image data to determine identification information for each object of the set of objects (block 520). As further shown in FIG. 5, process 500 may include obtaining exchange data related to at least one exchange log of the user (block 530). As further shown in FIG. 5, process 500 may include determining estimated exchange information for each object of a subset of objects of the set of objects (block 540). As further shown in FIG. 5, process 500 may include determining estimated assessment information for each object of the subset of objects (block 550). As further shown in FIG. 5, process 500 may include generating, based on the estimated assessment information, the presentation information for display via the GUI (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A server device for generating presentation information for display via a graphical user interface (GUI), the server device comprising:
    one or more memories; and one or more processors, communicatively coupled to the one or more memories, configured to:
obtain image data that depicts a set of objects associated with a user;
process, using at least one image analysis technique, the image data to determine identification information for each object of the set of objects;
obtain exchange data related to at least one exchange log of the user;
determine, based on the exchange data and the identification information, estimated exchange information for each object of a subset of objects of the set of objects;
determine, based on the estimated exchange information, estimated assessment information for each object of the subset of objects,
wherein the one or more processors, when determining the estimated assessment information for each object of the subset of objects, are configured to:
process the estimated exchange information for each object to determine the estimated assessment information for each object based on using a machine learning model to determine a threshold degree of similarity for the estimated assessment information to a particular assessment amount categorization group, and
wherein the estimated exchange information indicates at least one of an estimated exchange amount associated with each object and an estimated time of exchange associated with each object; and
generate, based on the estimated assessment information, the presentation information for display via the GUI,
wherein an insurance product recommendation for display via the GUI is generated based on the estimated assessment information to the particular assessment amount categorization group satisfying the threshold degree of similarity.

2. The server device of claim 1, wherein the identification information for each object, of the set of objects, indicates at least one of:
an identifier of each object;
a classification of each object;
a product name associated with each object;
a product model associated each object;
at least one imaging location associated with each object; or
at least one time of imaging of each object.

3. The server device of claim 1, wherein the estimated exchange information for each object, of the subset of objects, indicates at least one of:
an estimated exchange amount associated with each object; or
an estimated time of exchange associated with each object.

4. The server device of claim 1, wherein the estimated assessment information for each object, of the subset of objects, indicates an estimated assessment amount of each object.

5. The server device of claim 1, wherein the one or more processors, when obtaining the image data, are configured to at least one of:
obtain the image data from a user device associated with the user; or
obtain the image data from a device associated with an online service account of the user.

6. The server device of claim 1, wherein the one or more processors, when processing the image data to determine the identification information for each object of the set of objects, are configured to:
process the image data to identify a subset of the image data that is associated with a particular location associated with the user; and
process, using the at least one image analysis technique, the subset of the image data to determine the identification information for each object of the set of objects.

7. The server device of claim 1, wherein the one or more processors, when obtaining the exchange data, are configured to:
communicate with a user device associated with the user to obtain at least one authentication credential to access the at least one exchange log of the user;
communicate, with at least one data structure and based on the at least one authentication credential, to access the at least one exchange log of the user; and
obtain, based on accessing the at least one exchange log of the user, the exchange data.

8. The server device of claim 1, wherein the one or more processors, when determining the estimated exchange information for each object of the subset of objects, are configured to:
determine, based on the identification information for each object, at least one parameter associated with each object;
identify, based on the at least one parameter and the exchange data, an exchange event that is associated with each object;
determine, based on the exchange data, exchange event information associated with the exchange event; and
determine, based on the exchange event information, the estimated exchange information for each object.

9. The server device of claim 1, wherein the presentation information identifies, for each object of the subset of objects:
Some or all of the identification information for each object; and
some or all of the estimated assessment information for each object.

10. The server device of claim 1, wherein the one or more processors, are further configured to:
determine, based on the estimated assessment information for each object of the subset of objects, total estimated assessment information for the subset of objects; and
generate, based on the total estimated assessment information for the subset of objects, the insurance product recommendation for display via the GUI.

11. The server device of claim 1, wherein the one or more processors, communicatively coupled to the one or more memories, configured to:
generate, based on the estimated assessment information associated with the object, an insurance claim document associated the object; and
communicate with another server device, associated with an insurance company, to submit the insurance claim document.

12. A non-transitory computer-readable medium storing a set of instructions, the set of instructions comprising:
one or more instructions that, when executed by one or more processors of a device, cause the device to:
obtain image data that depicts a set of objects associated with a user;
process the image data to determine identification information for each object of the set of objects;

obtain exchange data related to at least one exchange log of the user;

determine, based on the exchange data and the identification information, estimated assessment information for each object of a subset of objects of the set of objects,
- wherein the one or more instructions, that cause the device to determine the estimated assessment information for each object of the subset of objects of the set of objects, cause the device to:
  - process the exchange data and the identification information for each object to determine the estimated assessment information for each object based on using a machine learning model to determine a threshold degree of similarity for the estimated assessment information to a particular assessment amount categorization group; and provide at least some of the estimated assessment information for display via a graphical user interface GUI,
- wherein an insurance product recommendation for display via the GUI is generated based on the estimated assessment information to the particular assessment amount categorization group satisfying the threshold degree of similarity.

13. The non-transitory computer-readable medium of claim 12, wherein the one or more instructions, that cause the device to obtain the image data, cause the device to:
- identify a data structure included in the device that is configured to store images captured by at least one camera of the device; and
- obtain the image data from the data structure.

14. The non-transitory computer-readable medium of claim 12, wherein the one or more instructions, that cause the device to process the image data to determine the identification information for each object of the set of objects, cause the device to:
- process, using at least one machine learning model, the image data to determine the identification information for each object of the set of objects.

15. The non-transitory computer-readable medium of claim 12, wherein the exchange data includes exchange information for each object of the subset of objects,
- wherein the exchange information indicates at least one of:
  - an exchange amount associated with each object; or
  - a time of exchange associated with each object.

16. The non-transitory computer-readable medium of claim 12, wherein the one or more instructions, when executed by the one or more processors, further cause the device to:
- determine, based on the estimated assessment information for each object of the subset of objects, total estimated assessment information for the subset of objects; and
- generate and submit, based on the total estimated assessment information for the subset of objects, an insurance claim document associated with the subset of objects.

17. The non-transitory computer-readable medium of claim 12, wherein the one or more instructions, that cause the device to obtain the image data, cause the device to:
- obtain the image data from a device associated with an online service account of the user.

18. A method of generating presentation information for display via a graphical user interface (GUI), comprising:
- obtaining, by a device, image data that depicts an object associated with a user;
- processing, by the device, the image data to determine identification information associated with the object;
- obtaining, by the device, exchange data related to at least one exchange log of the user;
- determining, by the device and based on the exchange data and the identification information associated with the object, estimated assessment information associated with the object,
  - wherein determining the estimated assessment information for the object comprises:
    - processing the exchange data and the identification information for the object to determine the estimated assessment information for the object based on using a machine learning model to determine a threshold degree of similarity for the estimated assessment information to a particular assessment amount categorization group; and
- generating, by the device and based on the estimated assessment information, the presentation information for display via the GUI,
  - wherein an insurance product recommendation for display via the GUI is generated based on the estimated assessment information to the particular assessment amount categorization group satisfying the threshold degree of similarity.

19. The method of claim 18, wherein determining the estimated assessment information associated with the object comprises:
- determining, based on the identification information and the exchange data, exchange event information associated with an exchange event that is associated with the object; and
- determining, based on the exchange event information, the estimated assessment information associated with the object.

20. The method of claim 18, further comprising at least one of:
- generating, based on the estimated assessment information associated with the object, the insurance product recommendation for display via the GUI; or
- generating and submitting, based on the estimated assessment information associated with the object, an insurance claim document associated the object.

* * * * *